(12) United States Patent
Park

(10) Patent No.: US 9,842,412 B2
(45) Date of Patent: Dec. 12, 2017

(54) RENDERING METHOD, RENDERING DEVICE, AND DISPLAY INCLUDING THE SAME

(71) Applicant: SAMSUNG DISPLAY CO., LTD., Yongin, Gyeonggi-Do (KR)

(72) Inventor: Jong-Woong Park, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 260 days.

(21) Appl. No.: 14/327,651

(22) Filed: Jul. 10, 2014

(65) Prior Publication Data

US 2015/0097854 A1 Apr. 9, 2015

(30) Foreign Application Priority Data

Oct. 7, 2013 (KR) ........................ 10-2013-0119423

(51) Int. Cl.
*G09G 5/02* (2006.01)
*G06T 11/00* (2006.01)

(52) U.S. Cl.
CPC .................................. *G06T 11/001* (2013.01)

(58) Field of Classification Search
CPC ... G09G 2300/0452; G09G 2300/0465; G09G 2320/0693; G09G 2320/0646; G09G 2320/0666; G09G 2340/0457; G09G 2340/06; G09G 3/2003; G09G 3/30; G09G 3/3208; G09G 3/34–3/3413; G09G 3/3607; G09G 5/02

See application file for complete search history.

(56) References Cited

U.S. PATENT DOCUMENTS

| | | | |
|---|---|---|---|
| 7,268,792 B2 * | 9/2007 | Lee | H04N 9/67 345/690 |
| 2003/0085906 A1 * | 5/2003 | Elliott | G09G 3/20 345/613 |
| 2004/0234163 A1 * | 11/2004 | Lee | G06T 3/4092 382/298 |
| 2006/0268003 A1 * | 11/2006 | Tanase | G09G 3/2003 345/603 |
| 2009/0102769 A1 * | 4/2009 | Kouno | G09G 3/3648 345/88 |
| 2009/0128467 A1 * | 5/2009 | Chen | G09G 3/3607 345/87 |
| 2009/0213048 A1 * | 8/2009 | Park | G09G 3/2003 345/77 |

(Continued)

FOREIGN PATENT DOCUMENTS

| | | |
|---|---|---|
| KR | 10-2009-0073903 A | 7/2009 |
| KR | 10-2011-0086287 A | 7/2011 |
| KR | 10-2014-0037717 A | 3/2014 |

*Primary Examiner* — Roberto Flores
(74) *Attorney, Agent, or Firm* — Lee & Morse, P.C.

(57) ABSTRACT

A rendering method includes performing a binary representation of input data by using input data of target subpixels of an RGB stripe structure, such that the binary representation defines binary data, calculating the binary data via a line detection mask to detect a target line made of the target subpixels, rendering adaptation data of a plurality of adaptation subpixels included in an adaptation line corresponding to the target line, and controlling the adaptation data of a plurality of white subpixels corresponding to the target line among a plurality of adaptation subpixels to generate output data.

17 Claims, 10 Drawing Sheets

(56) References Cited

U.S. PATENT DOCUMENTS

| | | | | |
|---|---|---|---|---|
| 2011/0043552 A1* | 2/2011 | Brown Elliott | ...... | G09G 3/3406 345/694 |
| 2011/0043553 A1* | 2/2011 | Brown Elliott | ...... | G09G 3/3406 345/694 |
| 2011/0181627 A1* | 7/2011 | You | ...... | G09G 3/3406 345/690 |
| 2014/0043357 A1* | 2/2014 | Yamato | ...... | G09G 3/3607 345/603 |
| 2014/0078197 A1* | 3/2014 | Park | ...... | G09G 3/3291 345/694 |
| 2014/0097760 A1* | 4/2014 | Kato | ...... | H05B 37/02 315/192 |
| 2014/0198140 A1* | 7/2014 | Yano | ...... | G09G 5/10 345/696 |
| 2015/0035847 A1* | 2/2015 | Park | ...... | G09G 3/2003 345/589 |

* cited by examiner

FIG. 10

Table 10

| 0 | 1 | 0 |
|---|---|---|
| 0 | 1 | 0 |
| 0 | 0 | 0 |

| 0 | 0 | 0 |
|---|---|---|
| 0 | 1 | 0 |
| 0 | 1 | 0 |

| 0 | 0 | 1 |
|---|---|---|
| 0 | 1 | 0 |
| 1 | 0 | 0 |

| 1 | 0 | 0 |
|---|---|---|
| 0 | 1 | 0 |
| 0 | 0 | 1 |

| 0 | 0 | 1 |
|---|---|---|
| 0 | 1 | 0 |
| 0 | 0 | 0 |

| 1 | 0 | 0 |
|---|---|---|
| 0 | 1 | 0 |
| 0 | 0 | 0 |

| 0 | 0 | 0 |
|---|---|---|
| 0 | 1 | 0 |
| 1 | 0 | 0 |

| 0 | 0 | 0 |
|---|---|---|
| 0 | 1 | 0 |
| 0 | 0 | 1 |

| 0 | 0 | 0 |
|---|---|---|
| 0 | 1 | 0 |
| 0 | 0 | 0 |

| 1 | 0 | 1 |
|---|---|---|
| 0 | 1 | 0 |
| 1 | 0 | 1 |

| 0 | 1 | 0 |
|---|---|---|
| 1 | 0 | 1 |
| 0 | 1 | 0 |

RENDERING METHOD, RENDERING DEVICE, AND DISPLAY INCLUDING THE SAME

CROSS-REFERENCE TO RELATED APPLICATION

Korean Patent Application No. 10-2013-0119423, filed on Oct. 7, 2013, in the Korean Intellectual Property Office, and entitled: "Rendering Method, Rendering Device, And Display Including The Same," is incorporated by reference herein in its entirety.

BACKGROUND

1. Field

Embodiments relate to a method and a device rendering input data of a RGB stripe structure into data suitable for a pixel of a RGBW structure to improve visibility, and a display device including the same.

2. Description of the Related Art

An organic light emitting diode (OLED) display has been paid much attention as a next-generation display because of its merits, e.g., a wide viewing angle, a fast response rate, and a relatively lower power consumption, as well as smaller weight and size. The organic light emitting diode (OLED) display uses light generated by an organic light emitting element formed at each pixel to display an image.

A white (W) pixel for controlling an amount of light without a color component may be added to the organic light emitting diode (OLED) display in addition to red, green, and blue (RGB) pixels that are generally used so as to express an image with various colors, so the organic light emitting diode (OLED) display may have red, green, blue, and white (RGBW) pixels. As such, the organic light emitting diode (OLED) display may improve color representation capability and luminance.

SUMMARY

Embodiments render input data of an RGB stripe structure into data suitable for a pixel of an RGBW structure to improve visibility.

A rendering method according to embodiments includes performing a binary representation of input data by using input data of target subpixels of an RGB stripe structure, such that the binary representation defines binary data, calculating the binary data via a line detection mask to detect a target line made of the target subpixels, rendering adaptation data of a plurality of adaptation subpixels included in an adaptation line corresponding to the target line, and controlling the adaptation data of a plurality of white subpixels corresponding to the target line among a plurality of adaptation subpixels to generate output data.

The target line and the adaptation line may be formed of red or blue subpixels.

The detected target line may be a vertical line, and the output data of a luminance value of a white subpixel may emit all columns of white subpixels adjacent to the vertical line in a first direction.

The detected target line may be a diagonal line, and the output data of the luminance value of the white subpixel may emit the white subpixels adjacent to the vertical line in a first direction.

The line detection mask may be positioned at a center of the target subpixels, and the rendering method may further include moving the line detection mask by the subpixel unit after the rendering of the target subpixel.

The line detection mask may include at least three pixel rows and at least three pixel columns.

A rendering device rendering input data controlling a brightness of pixels according to an RGB stripe structure into an adaptation data according to an RGBW structure includes: a rendering unit, wherein the rendering unit performs binary representation of input data by using the input data of target subpixels of an RGB stripe structure; calculates the binary data and a line detection mask to detect a target line made of the target subpixels; and controls the adaptation data of the adaptation subpixel included in the adaptation line corresponding to the target line to control a luminance value, emits a white subpixel corresponding to the target line among the adaptation subpixels, and controls the adaptation data of the white subpixel to generate output data controlling the luminance value of the white subpixel.

The target line and the adaptation line may be formed of red or blue subpixels.

The rendering device may further include a line buffer storing input data of as many as a number of lines required for detecting a target line by a line unit, the line buffer may include a predetermined number of line buffers that is greater than a size of the line detection mask minus one, and the line unit means a set of a plurality of input data controlling emission of the pixels of one row in the RGB stripe structure.

The detected target line may be a vertical line, and the output data of a luminance value of the white subpixel may emit all columns of the white subpixels adjacent to the vertical line in a first direction.

The detected target line may be a diagonal line, and the output data of the luminance value of the white subpixel may emit the white subpixels adjacent to the vertical line in a first direction.

Also, a display device according to embodiments includes a display panel including: a plurality of gate lines transmitting a plurality of gate signals, a plurality of data lines transmitting a plurality of data voltages, and a plurality of subpixels connected to a corresponding one among a plurality of gate lines and a corresponding one among a plurality of data lines, wherein the plurality of subpixels are formed in a pixel including red, green, blue, and white subpixels; a rendering device performing binary representation of input data by using the input data of target subpixels of an RGB stripe structure, calculating the binary data and a line detection mask to detect a target line made of the target subpixels, rendering adaptation data of a plurality of adaptation subpixels included an adaptation line corresponding to the target line, and controlling the adaptation data of a plurality of white subpixels corresponding to the target line among a plurality of adaptation subpixels to generate output data for a target line and an adaptation line; and a data driver generating a plurality of data voltages according to the output data respectively corresponding to a plurality of subpixels.

The target line and adaptation line may be formed of red or blue subpixels.

The detected target line may be a vertical line, and the output data of the luminance value of the white subpixel may emit all columns of the white subpixels adjacent to the vertical line in a first direction.

The detected target line may be a diagonal line, and the output data of the luminance value of the white subpixel may emit the white subpixels adjacent to the vertical line in a first direction.

The line detection mask may be positioned at a center of the target subpixels, and the line detection mask may be moved by the subpixel unit after the rendering of the target subpixel.

The line detection mask may include at least three pixel rows and at least three pixel columns.

BRIEF DESCRIPTION OF THE DRAWINGS

Features will become apparent to those of ordinary skill in the art by describing in detail exemplary embodiments with reference to the attached drawings, in which:

FIG. 10 illustrates a plurality of masks that can be used in a rendering device according to exemplary embodiments.

DETAILED DESCRIPTION

Figure 1:
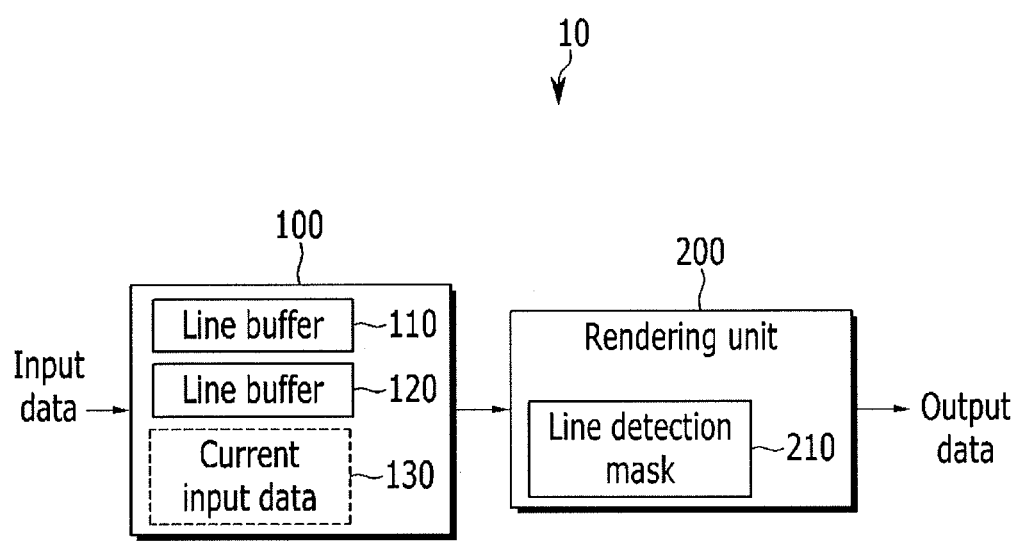
FIG. 1 illustrates a schematic diagram of a rendering device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Now, an exemplary embodiment will be described with reference to the accompanying drawings. A rendering device 10 according to an exemplary embodiment detects a light emission pattern of a red or blue subpixel by using input data of an RGB stripe structure, and generates a signal emitting a white subpixel corresponding to the red or blue subpixel of a predetermined line when the detected light emission pattern forms the predetermined line (e.g., a vertical line or a diagonal line).

FIG. 1 illustrates a schematic view of the rendering device 10 according to an exemplary embodiment. Referring to FIG. 1, the rendering device 10 may include a line buffer 100 and a rendering unit 200.

The line buffer 100 stores input data, of which there are as many as a number of lines used for line detection by a line unit. If a size of a line detection mask 210 according to an exemplary embodiment is determined, the number of line buffers included in the line buffer 100 is determined by considering the size of the line detection mask 210. The term "line unit" represents a set of a plurality of input data for controlling light emission of the pixels in one row in the RGB stripe structure.

For example, when the size of the line detection mask 210 is 3×3, the line buffer 100 includes at least two line buffers, i.e., first and second line buffers 110 and 120. For example, the input data in the 3×3 line detection mask 210 with reference to a target pixel includes second previous input data stored in the line buffer 110, previous input data stored in the line buffer 120, and current input data 130 that is currently input.

The rendering unit 200 binarily represents the input data input to the line buffer 100 by the line unit, and may store it in the corresponding line buffer 100. The rendering unit 200 binarily represents the data and the line detection mask 210 through an exclusive-or operation (XOR) to detect a predetermined line by one frame unit.

The binary representation may be performed by using a predetermined reference luminance value between a maximum luminance value and a minimum luminance value, when the maximum luminance value to be emitted by each subpixel is referred to as 100 and the minimum luminance value is referred to as zero (0). In example embodiments, the binary representation means that the input data is converted into 1 if the current luminance value emitted by the input data is more than the reference luminance value, and the input data is converted into 0 if the current luminance value is less than the reference luminance value.

The rendering unit 200 may render the data to control the light emission of each subpixel in the data of the input RGB stripe pixel structure to be appropriate for the RGBW pixel structure. The rendering unit 200 may adapt the line detection result to the rendered data to control the luminance of the red or blue subpixel that is emitted in the predetermined line (straight or diagonal), and may generate output data controlling the luminance of the white subpixel corresponding to the red or blue subpixel that is emitted per frame.

Hereafter, the data to control the emission of each subpixel in the input data of the RGB stripe pixel structure is referred to as input data, and the data to control the emission of each subpixel in the RGBW pixel structure is referred to as adaptation data. Also, the luminance value of the pixel emitted according to the input data is referred to as a current luminance value, the luminance value of the pixel emitted according to the adaptation data is referred to as an adaptation luminance value, and an operation converting the input data into the adaptation data is referred to as rendering.

Figure 2:
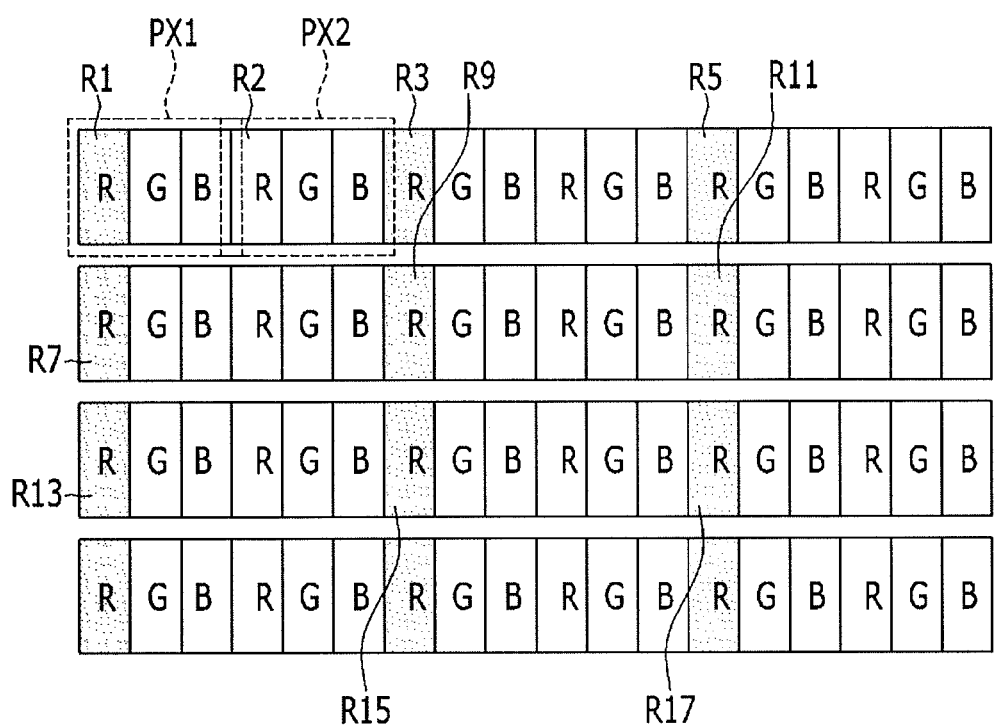
FIG. 2 illustrates a view of a pixel arrangement of one frame corresponding to vertical line input data according to an exemplary embodiment.

Next, a vertical line output data generation operation of the rendering unit 200 will be described in detail with reference to FIG. 2 to FIG. 4. FIG. 2 illustrates a view of a pixel arrangement of one frame corresponding to vertical line input data according to an exemplary embodiment, FIG. 3 illustrates a view of a vertical line detection operation of a rendering device according to an exemplary embodiment, and FIG. 4 illustrates a view of a pixel arrangement of one frame corresponding to vertical line input data according to an exemplary embodiment.

Figure 3:
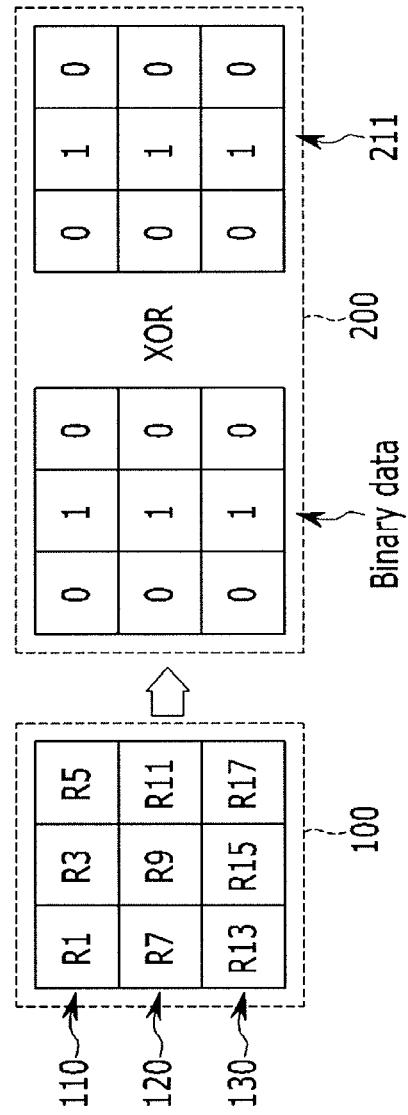
FIG. 3 illustrates a view of a vertical line detection operation of a rendering device according to an exemplary embodiment.
Figure 4:
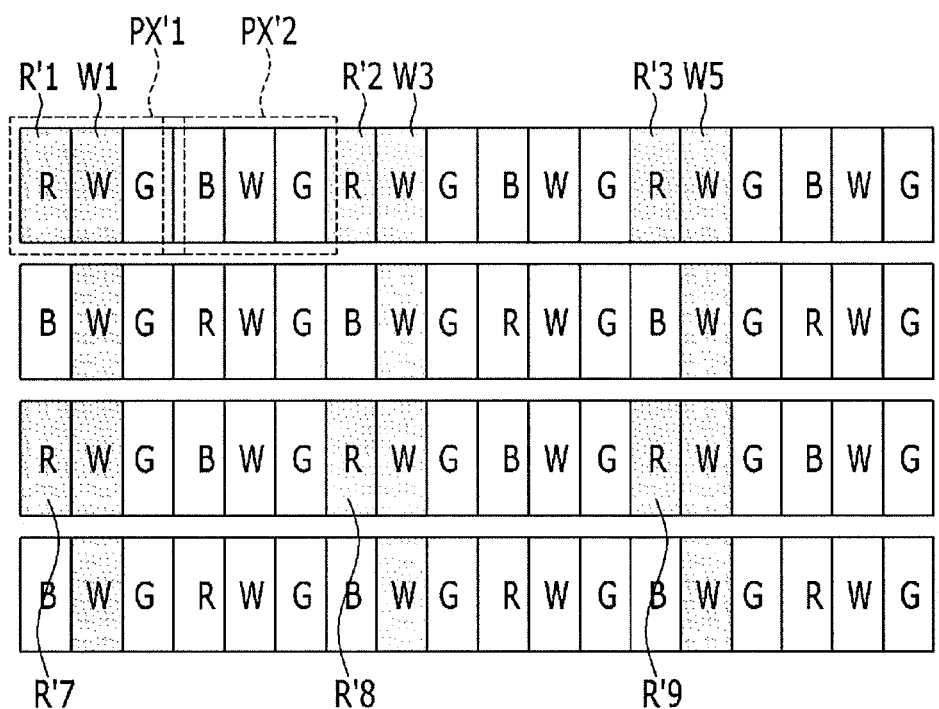
FIG. 4 illustrates a view of a pixel arrangement of one frame corresponding to vertical line input data according to an exemplary embodiment.

Referring to FIG. 2, a red subpixel of each vertical line including a red subpixel R1, a red subpixel R3, and a red subpixel R5 is emitted by the input data in one frame, and the rendering unit 200 includes a vertical line mask 211 of Table 1 of a size 3×3 (FIG. 3).

TABLE 1

| 0 | 1 | 0 |
|---|---|---|
| 0 | 1 | 0 |
| 0 | 1 | 0 |

Referring to FIG. 3, the line buffer 100 includes the first and second line buffers 110 and 120. In the line buffer 100, among the input data, the input data of the emitted subpixel are only sequentially stored to each line buffer for each line. Accordingly, the second previous input data of the red subpixels R1, R3, and R5 are stored in the first line buffer 110, and the previous input data of the red subpixels R7, R9, and R11 are stored to the second line buffer 120.

The rendering unit 200 forms a 3×3 arrangement of the data in the line buffer 100, i.e., Table 2, by using the second previous input data of the line buffer 110, the previous input data of the line buffer 120, and the current input data of the red subpixels R13, R15, and R17. Further, the rendering unit 200 performs the binary representation by using Table 2, i.e., converts the data in Table 2 into a binary representation (Table 3).

TABLE 2

| R1  | R3  | R5  |
|-----|-----|-----|
| R7  | R9  | R11 |
| R13 | R15 | R17 |

For example, if the reference luminance value is 50, the current luminance value of the red subpixel R1 is 30, the current luminance value of the red subpixel R3 is 60, the current luminance value of the red subpixel R5 is 20, the current luminance value of the red subpixel R7 is 10, the current luminance value of the red subpixel R9 is 90, the current luminance value of the red subpixel R11 is 40, the current luminance value of the red subpixel R13 is 25, the current luminance value of the red subpixel R15 is 60, and the current luminance value of the red subpixel R17 is 30, the binary data of Table 3 is generated.

TABLE 3

| 0 | 1 | 0 |
|---|---|---|
| 0 | 1 | 0 |
| 0 | 1 | 0 |

The rendering unit 200 may perform the XOR calculation by applying the vertical line mask 211 to the binary data of Table 3. The rendering unit 200 checks the XOR calculation result through ALL FALSE. If ALL FALSE, in which all XOR calculation result values are 0, is obtained, the line including the red subpixels corresponding to 1 within the vertical line mask 211 may be detected as a vertical line. In this way, the rendering unit 200 moves the vertical line mask 211 in a direction (hereinafter, a first direction) from the red subpixel R1 to the red subpixel R2, and the vertical line may be detected for each frame.

In detail, the rendering unit 200 may generate the XOR result as in Table 4 and check the ALL FALSE.

TABLE 4

| 0 | 0 | 0 |
|---|---|---|
| 0 | 0 | 0 |
| 0 | 0 | 0 |

Accordingly, since the XOR result corresponds to ALL FALSE as in Table 4, the rendering unit 200 may detect the line including the red subpixel R1, the red subpixel R3, and the red subpixel R5 as a vertical line.

The rendering unit 200 may perform the rendering by the frame unit by corresponding the pixel PX1 of FIG. 2 to the pixel PX'1 of FIG. 4 and the pixel PX2 of FIG. 2 to the pixel PX'2 of FIG. 4. The rendering unit 200 may perform the rendering for the sum of the current luminance value of the subpixel (e.g., R1) of the pixel PX1 as 50% and the current luminance value of the subpixel (e.g., R2) of the pixel PX2 as 50% to be the luminance value of the subpixel (e.g., R'1) of the pixel PX'1.

When the vertical line is detected, the rendering unit 200 may generate the output data including a red (or blue) subpixel output luminance value controlling the luminance of the red (or blue) subpixel included in the vertical line to be increased compared to the adaptation luminance value by 50% and the luminance value of the red (or blue) subpixel that is not included in the vertical line to be decreased compared to the adaptation luminance value by 50%.

The rendering unit 200 may generate the output luminance value of the white subpixel by using Equation 1 below and the output data controlling the white subpixel adjacent to the detected vertical line in the first direction to be emitted with the white subpixel output luminance value.

The white subpixel output luminance value=the adaptation luminance value*α of the red (or blue) subpixel, where (0<α<1 or 0<α<0.25)  [Equation 1]

Referring to FIGS. 3 and 4, the rendering unit 200 detects the vertical line including the red subpixels R1, R2, and R3, and may generate the output data for the red subpixels R'2, R'3, R'7, R'8, and R'9 to be emitted according to the red subpixel output luminance value for each frame. Also, the rendering unit 200 may generate the output data for each frame for the vertical line including the white subpixels W1, W3, and W5 to be emitted by the white subpixel output luminance value. Accordingly, the rendering unit 200 may detect the vertical line made of the red or blue subpixel and control the white subpixel adjacent to the detected vertical line to be emitted together.

For convenience of description, it is described that the vertical line mask 211 only uses Table 1, however it is not limited thereto, e.g., Table 5 or Table 6 may be used.

TABLE 5

| | | |
|---|---|---|
| 1 | 0 | 0 |
| 1 | 0 | 0 |
| 1 | 0 | 0 |

TABLE 6

| | | |
|---|---|---|
| 0 | 0 | 1 |
| 0 | 0 | 1 |
| 0 | 0 | 1 |

Figure 5:
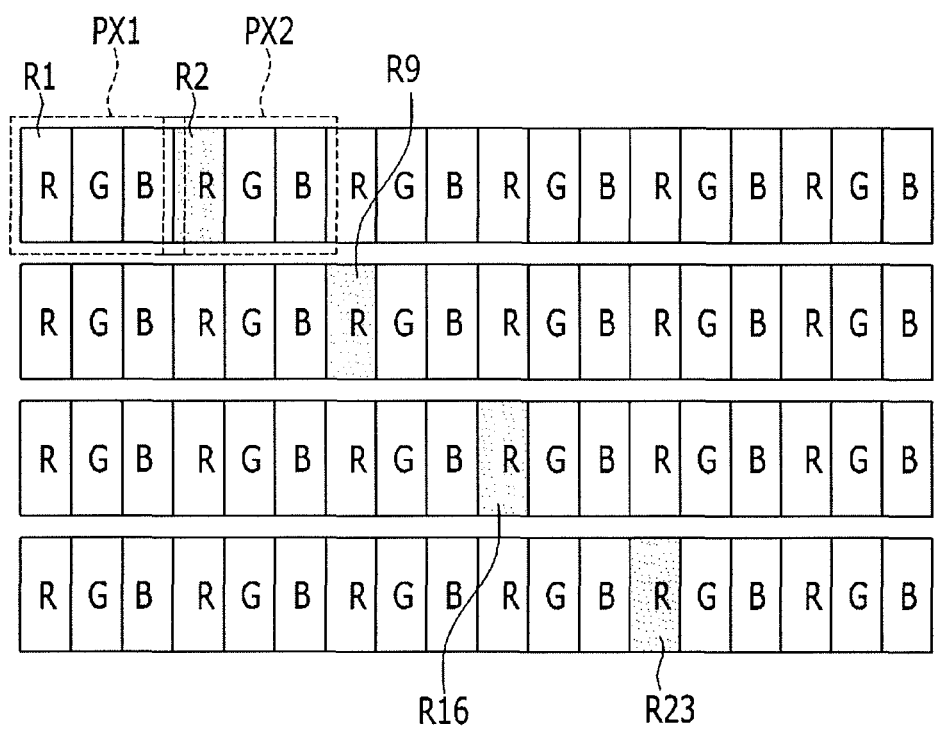
FIG. 5 illustrates a view of a vertical line detection operation of a rendering device according to another exemplary embodiment.
Figure 6:
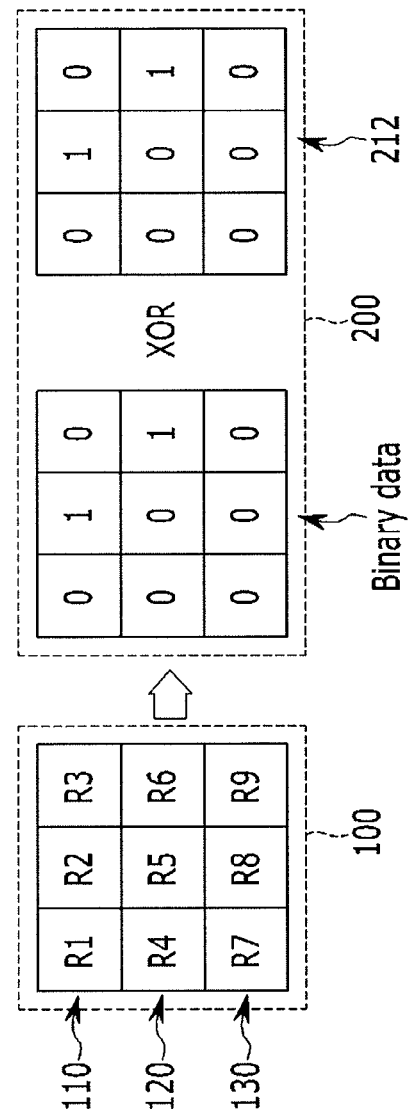
FIG. 6 illustrates a view of a diagonal line detection operation of a rendering device according to another exemplary embodiment.
Figure 7:
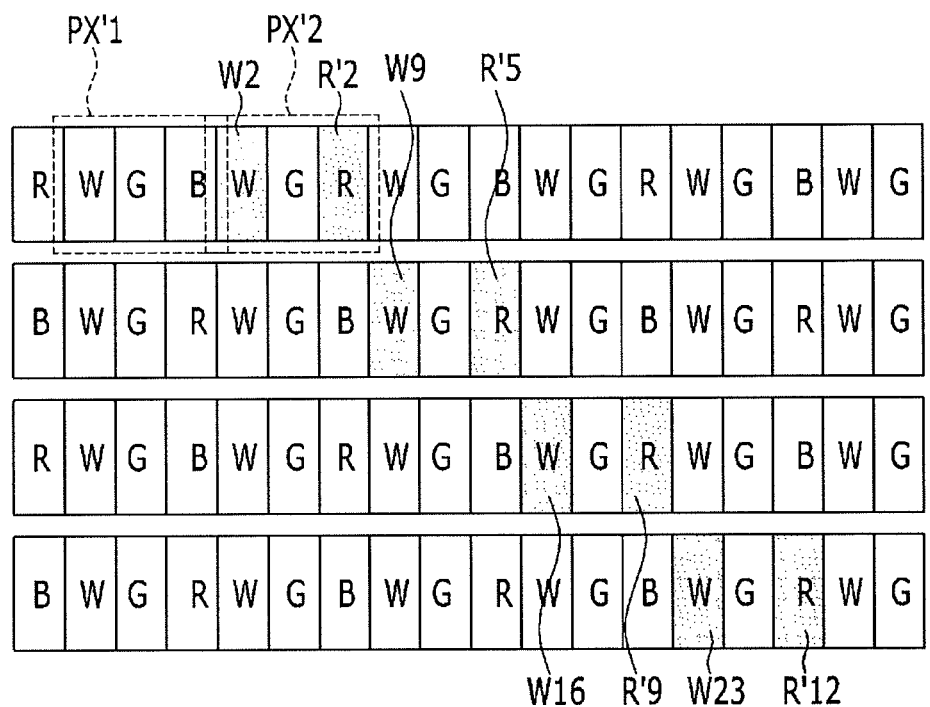
FIG. 7 illustrates a view of a pixel arrangement of one frame corresponding to diagonal line adaptation data according to another exemplary embodiment.

FIG. 5 illustrates a view of a vertical line detection operation of a rendering device according to another exemplary embodiment. FIG. 6 illustrates a view of a diagonal line detection operation of a rendering device according to the other exemplary embodiment. FIG. 7 illustrates a view of a pixel arrangement of one frame corresponding to diagonal line adaptation data according to the other exemplary embodiment.

Next, a diagonal line output data generation operation of the rendering unit 200 will be described in detail with reference to FIG. 5 to FIG. 7. The description for the same or like components as in FIG. 1 to FIG. 4 is omitted, and like reference numerals designate like elements.

Referring to FIG. 5, the red subpixels of a diagonal line including the red subpixels R2, R9, R16, and R23 are emitted by the input data in one frame, and the rendering unit 200 includes a diagonal line mask 212 of Table 7 of a size 3×3.

TABLE 7

| | | |
|---|---|---|
| 0 | 1 | 0 |
| 0 | 0 | 1 |
| 0 | 0 | 0 |

Referring to FIG. 6, the second previous input data of the red subpixels R1, R2, and R3 are stored to the first line buffer 110, and the previous input data of the red subpixels R4, R5, and R6 are stored to the second line buffer 120. The current input data 130 of the red subpixels R7, R8, and R9 may be formed with the 3×3 arrangement of Table 8.

TABLE 8

| R1 | R2 | R3 |
| R4 | R5 | R6 |
| R7 | R8 | R9 |

The rendering unit 200 may arrange the second previous input data of the line buffer 110 that are previously stored, the previous input data of the line buffer 120 that are previously stored, and the current input data 130 as in Table 2, and may perform the binary representation. For example, if the reference luminance value is 50, the current luminance value of the red subpixel R1 is 30, the current luminance value of the red subpixel R2 is 60, the current luminance value of the red subpixel R3 is 20, the current luminance value of the red subpixel R4 is 10, the current luminance value of the red subpixel R5 is 30, the current luminance value of the red subpixel R6 is 75, the current luminance value of the red subpixel R7 is 25, the current luminance value of the red subpixel R8 is 10, and the current luminance value of the red subpixel R9 is 30, the binary data of Table 8 is generated.

The rendering unit 200 may perform the XOR calculation by applying the diagonal line mask 212 to the generated data of Table 9.

TABLE 9

| | | |
|---|---|---|
| 0 | 1 | 0 |
| 0 | 0 | 1 |
| 0 | 0 | 0 |

The rendering unit 200 checks the XOR calculation result through ALL FALSE, and if ALL FALSE in which all XOR calculation result values are 0 is obtained, the rendering unit 200 may detect the line made of the red subpixels corresponding to 1 within the diagonal line mask 212 as the diagonal line. In detail, if the first row 0, 1, 0 of Table 9 and the first row 0, 1, 0 of the line mask 212 are applied with the XOR calculation, 0, 0, 0 are generated, and if the second row 0, 0, 1 of Table 9 and the second row 0, 0, 1 of the line mask 212 are applied with the XOR calculation, 0, 0, 0 are generated. Also, if the third row 0, 0, 0 of Table 9 and the third row 0, 0, 0 of the line mask 212 are applied with the XOR calculation, 0, 0, 0 are generated. Accordingly, the XOR calculation result corresponds to ALL FALSE in which all are 0. The rendering unit 200 may detect the line including the red subpixels R2 and R6 corresponding to 1 of the first row 0, 1, 0 of the line mask 212 and 1 of the second row 0, 0, 1 as the diagonal line.

In this way, the rendering unit 200 performs the binary data representation and the XOR calculation while moving the diagonal line mask 212 in the first direction, and checks the XOR calculation result of ALL FALSE thereby detecting the line including the red subpixels R2, R9, R16, and R23 shown in FIG. 5 as the diagonal line.

Referring to FIGS. 5 and 7, the rendering unit 200 corresponds to the pixel PX1 to the pixel PX'1 and the pixel PX2 to the pixel PX'2 to perform the rendering by the frame unit.

In the case of the diagonal line, the subpixels of FIG. 7 may not correspond to the diagonal line subpixels of FIG. 5. When there is no corresponding pixel, the diagonal line mask 212 corresponds to the subpixel most adjacent in the first direction. In detail, the pixel PX2 and the pixel PX'2 correspond to each other, however there is no red subpixel corresponding to the red subpixel R2 in the pixel PX'2. Accordingly, the rendering unit 200 may perform the rendering by corresponding the red subpixel R'2 most adjacent in the first direction to the diagonal line mask 212.

The rendering unit 200 may generate the output data for each frame for the red subpixels R'2, R'5, R'9, and R'12 corresponding to the diagonal line including the detected red subpixels R2, R9, R16, and R23 to be emitted according to the red subpixel output luminance value. Also, the rendering unit 200 may generate the output data for each frame for the diagonal line including the white subpixels W2, W9, W16, and W23 to be emitted according to the white subpixel output luminance value. Accordingly, the rendering unit 200 may detect the diagonal line made of the blue or white subpixel and may control the white subpixel adjacent to the detected diagonal line to be emitted together.

For convenience of description, it is described that the diagonal line mask 212 only uses Table 6. However, embodiments are not limited thereto, e.g., one mask among a plurality of 3×3 masks of Table 10 in FIG. 10.

Figure 8:
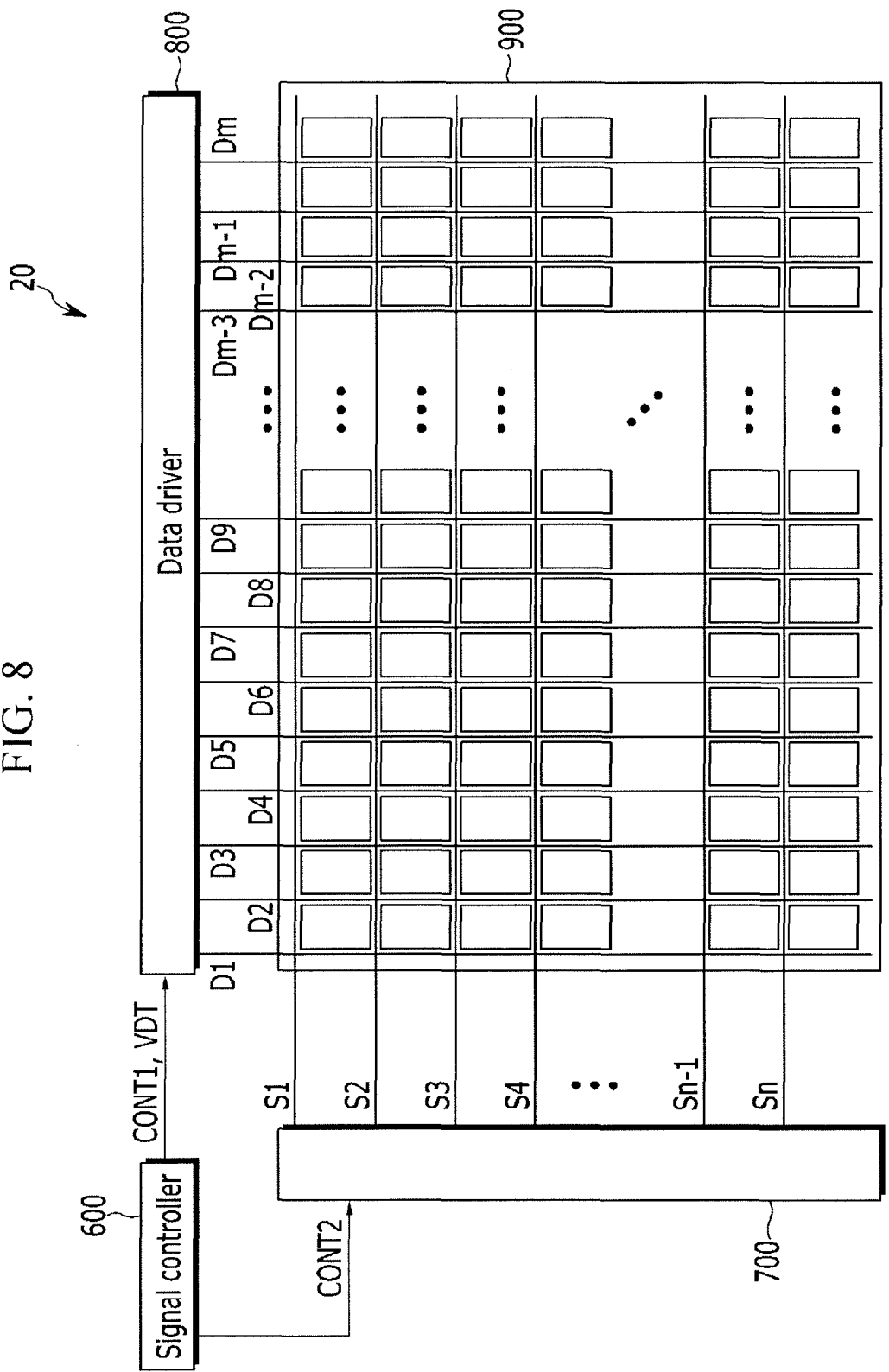
FIG. 8 illustrates a view of a display device according to an exemplary embodiment.

Next, a display device according to an exemplary embodiment will be described with reference to FIG. 8. FIG. 8 illustrates a view of a display device according to an exemplary embodiment.

Referring to FIG. 8, a display device 20 may include a signal controller 600, a gate driver 700, a data driver 800, and a display panel 900.

The signal controller 600 includes a rendering device 10. However, embodiments are not restricted thereto, e.g., the signal controller 600 and the rendering device 10 may be formed separately.

The signal controller 600 generates a first drive control signal CONT1 and a second drive control signal CONT2 according to a vertical synchronization signal for distinguishing a frame of an image, a horizontal synchronization signal for distinguishing a line of a frame, and a data enable signal for controlling a period for applying a data voltage to a plurality of data lines D1-Dm. The signal controller 600 generates gamma data for displaying luminance according to the output data generated from the rendering device 10 and arranges the gamma data to generate a data signal VDT, and transmits the data signal VDT and the first drive control signal CONT1 to the data driver 800. The second drive control signal CONT2 is transmitted to the gate driver 700.

The gate driver 700 transmits a plurality of gate signals G[1]-G[n] to a plurality of gate lines S1-Sn according to the second drive control signal CONT2. The data driver 800 transforms the data signal VDT into a plurality of data voltages D[1]-D[m] according to the first drive control signal CONT1, and transmits them to a plurality of data lines D1-Dm. The display panel 900 includes a plurality of gate lines G1-Gn, a plurality of data lines D1-Dm, and a plurality of pentile-type subpixels.

The respective gate lines G1-Gn are formed in the horizontal direction, and the gate lines S1-Sn are continuously provided in the vertical direction. The data lines D1-Dm are formed in the vertical direction, and the data lines D1-Dm are continuously provided in the horizontal direction. The plurality of subpixels is respectively connected to a corresponding one from among the gate lines G1-Gn and a corresponding one from among the data lines D1-Dm.

Figure 9:
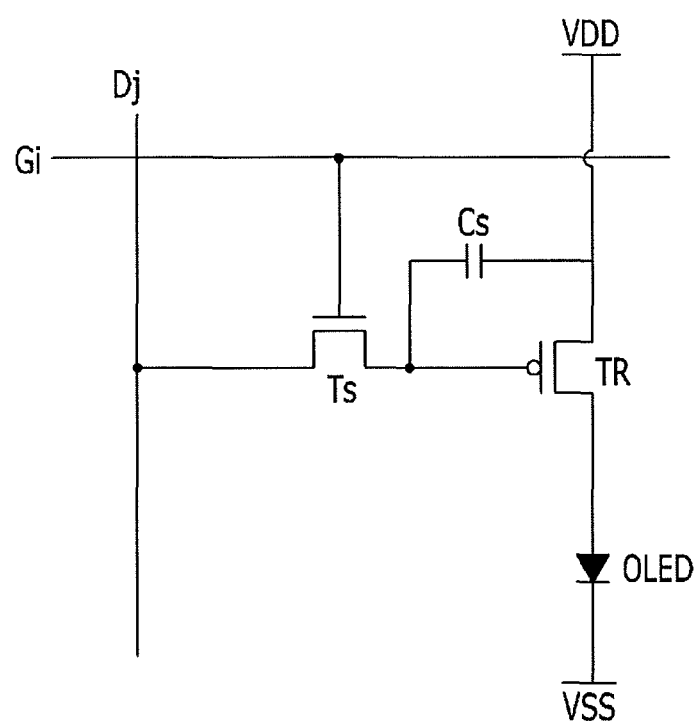
FIG. 9 illustrates a view of a driving circuit of a subpixel and a light-emitting device according to an exemplary embodiment.

FIG. 9 illustrates a view of a driving circuit of a subpixel and a light-emitting device according to an exemplary embodiment. The subpixel shown in FIG. 9 indicates a subpixel connected to an i-th scan line and a j-th data line.

Referring to FIG. 9, the subpixel Pij includes a switching transistor TS, a driving transistor TR, and a storage capacitor CS. A cathode of the organic light emitting diode (OLED) is connected to a voltage source VSS.

The switching transistor TS includes a gate electrode connected to a gate line Gi, and a first electrode and a second electrode connected to a data line Dj. The driving transistor TR includes a gate electrode connected to the second electrode of the switching transistor TS, a source electrode connected to a voltage source VDD, and a drain electrode connected to an anode of the organic light emitting diode (OLED). The storage capacitor CS is connected between the gate electrode and the source electrode of the driving transistor TR.

When the switching transistor TS is turned on by a gate signal with a gate-on voltage transmitted through the gate wire Gi, a data voltage is transmitted to the gate electrode of the driving transistor TR through the data line Dj. The voltage caused by the data voltage transmitted to the gate electrode of the driving transistor TR is maintained by the storage capacitor CS. A driving current following the voltage maintained by the storage capacitor CS flows to the driving transistor TR. The driving current flows to the organic light emitting diode (OLED), and the organic light emitting diode (OLED) emits light with the luminance according to the driving current.

By way of summary and review, a conventional organic light emitting diode (OLED) display having a RGBW pixels structure, may have four subpixels in each pixel. As such, an aperture ratio of a saturated color portion is reduced, lifetime of the red, green, and blue subpixels is reduced, and visibility is decreased.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rendering method, comprising:
performing a binary representation of input data by using input data of target subpixels of an RGB stripe structure, such that the binary representation defines binary data;
calculating the binary data via a line detection mask using an XOR operation to detect a target line made of the target subpixels, the target line detected when all values of a result of the XOR operation are a same value;
rendering adaptation data of a plurality of adaptation subpixels having an RGBW subpixel structure included in an adaptation line corresponding to the target line;
controlling a luminance value of an R subpixel or a B subpixel to be increased if the R subpixel or the B subpixel is included in the target line or controlling a luminance value of the R subpixel or the B subpixel to be decreased if the R subpixel or the B subpixel is not included in the target line; and
controlling the adaptation data of a plurality of white subpixels corresponding to the target line among a plurality of adaptation subpixels according to the controlled luminance value of the R subpixel or the B subpixel included in the target line, to generate output data, wherein the plurality of white subpixels are disposed next to a plurality of green pixels in a first row direction, and the plurality of white subpixels are disposed between the plurality of green pixels and a plurality of red pixels or a plurality of blue pixels.

2. The rendering method as claimed in claim 1, wherein the target line and the adaptation line are formed of red or blue subpixels.

3. The rendering method as claimed in claim 2, wherein the detected target line is a vertical line, and
the output data of a luminance value of the white subpixel emits all columns of white subpixels adjacent to the vertical line in a first direction.

4. The rendering method as claimed in claim 2, wherein the detected target line is a diagonal line, and
the output data of a luminance value of a white subpixel emits white subpixels adjacent to a vertical line in a first direction.

5. The rendering method as claimed in claim 2, wherein the line detection mask is positioned at a center of the target subpixels,
and the method includes moving the line detection mask by a subpixel unit after the rendering of the target subpixel.

6. The rendering method as claimed in claim 5, wherein the line detection mask includes at least three pixel rows and at least three pixel columns.

7. A rendering device for rendering input data according to an RGB stripe structure into adaptation data according to an RGBW subpixel structure, the rendering device comprising:
   a renderer to:
   perform a binary representation of input data by using input data of target subpixels of the RGB stripe structure,
   calculate binary data and a line detection mask using an XOR operation to detect a target line made of the target subpixels, the target line detected when all values of a result of the XOR operation are a same value; and
   control the adaptation data of an adaptation subpixel included in an adaptation line corresponding to the target line to control a luminance value of an R subpixel or a B subpixel to be increased if the R subpixel or the B subpixel is included in the target line, or a luminance value of the R subpixel or the B subpixel to be decreased if the R subpixel or the B subpixel is not included in the target line, and to emit a white subpixel corresponding to the target line among the adaptation subpixels, and control the adaptation data of the white subpixel according to the controlled luminance value of the R subpixel or the B subpixel included in the target line, to generate output data controlling the luminance value of the white subpixel, wherein the white subpixel is disposed next to a green pixel in a first row direction, and the white subpixel is disposed between the green pixel and a red pixel or a blue pixel.

8. The rendering device as claimed in claim 7, wherein the target line and the adaptation line include red or blue subpixels.

9. The rendering device as claimed in claim 7, further comprising
   a line buffer storing input data of as many as a number of lines required for detecting a target line by a line unit, the line buffer including:
   a predetermined number of line buffers that is greater than a size of the line detection mask minus one; and
   the line unit is a set of a plurality of input data controlling emission of pixels of one row in the RGB stripe structure.

10. The rendering device as claimed in claim 9, wherein the detected target line is a vertical line, and the output data of a luminance value of the white subpixel emits all columns of the white subpixels adjacent to the vertical line in a first direction.

11. The rendering device as claimed in claim 9, wherein the detected target line is a diagonal line, and the output data of the luminance value of the white subpixel emits the white subpixels adjacent to a vertical line in a first direction.

12. A display device, comprising:
   a display panel including a plurality of gate lines transmitting a plurality of gate signals, a plurality of data lines transmitting a plurality of data voltages, and a plurality of subpixels connected to a corresponding one among a plurality of gate lines and a corresponding one among a plurality of data lines, wherein the plurality of subpixels are formed in a pixel including red, green, blue, and white subpixels;
   a renderer to perform a binary representation of input data by using input data of target subpixels of an RGB stripe structure, calculate the binary data and a line detection mask to detect a target line made of the target subpixels using an XOR operation, the target line detected when all values of a result of the XOR operation are a same value, render adaptation data of a plurality of adaptation subpixels having an RGBW subpixel structure included in an adaptation line corresponding to the target line, control a luminance value of an R subpixel or a B subpixel to be increased if the R subpixel or the B subpixel is included in the target line or controlling a luminance value of the R subpixel or the B subpixel to be decreased if the R subpixel or the B subpixel is not included in the target line, and control the adaptation data of a plurality of white subpixels corresponding to the target line among a plurality of adaptation subpixels according to the controlled luminance value of the R subpixel or the B subpixel included in the target line to generate output data for a target line and an adaptation line; and
   a data driver generating a plurality of data voltages according to the output data respectively corresponding to a plurality of subpixels, wherein a white subpixel is disposed next to the green pixel in a first row direction, and the white subpixel is disposed between the green pixel and the red pixel or the blue pixel.

13. The display device as claimed in claim 12, wherein the target line and adaptation line are formed of red or blue subpixels.

14. The display device as claimed in claim 13, wherein the detected target line is a vertical line, and the output data of a luminance value of the white subpixel emits all columns of the white subpixels adjacent to the vertical line in a first direction.

15. The display device as claimed in claim 13, wherein the detected target line is a diagonal line, and the output data of a luminance value of the white subpixel emits the white subpixels adjacent to a vertical line in a first direction.

16. The display device as claimed in claim 13, wherein the line detection mask is positioned at a center of the target subpixels, and the line detection mask is moved by a subpixel unit after the rendering of the target subpixel.

17. The display device as claimed in claim 16, wherein the line detection mask includes at least three pixel rows and at least three pixel columns.

* * * * *